(12) United States Patent
Gou et al.

(10) Patent No.: US 8,508,390 B2
(45) Date of Patent: Aug. 13, 2013

(54) COMBINING TRANSFORM COEFFICIENT DECODING WITH VARIABLE LENGTH DECODING

(76) Inventors: Dayin Gou, San Jose, CA (US); Shuguang Gong, Beijing (CN)

( * ) Notice: Subject to any disclaimer, the term of this patent is extended or adjusted under 35 U.S.C. 154(b) by 21 days.

(21) Appl. No.: 13/003,068

(22) PCT Filed: Aug. 18, 2009

(86) PCT No.: PCT/US2009/054119
§ 371 (c)(1),
(2), (4) Date: Apr. 4, 2011

(87) PCT Pub. No.: WO2010/022023
PCT Pub. Date: Feb. 25, 2010

(65) Prior Publication Data
US 2011/0169670 A1    Jul. 14, 2011

Related U.S. Application Data

(60) Provisional application No. 61/089,833, filed on Aug. 18, 2008.

(51) Int. Cl.
*H03M 7/40* (2006.01)

(52) U.S. Cl.
USPC .............................................. 341/67; 341/65

(58) Field of Classification Search
USPC .... 341/67, 51, 66, 65, 106, 107; 375/240.16, 375/240.18, 240.24, 240.23, 240.22, 240.2; 382/246, 233, 250
See application file for complete search history.

(56) References Cited

U.S. PATENT DOCUMENTS

| | | |
|---|---|---|
| 6,667,701 B1 * | 12/2003 | Tao ................................. 341/67 |
| 2003/0118115 A1 | 6/2003 | Yang et al. |
| 2006/0187096 A1 | 8/2006 | Zheltov et al. |
| 2007/0109160 A1 | 5/2007 | Pisarevsky et al. |

\* cited by examiner

*Primary Examiner* — Joseph Lauture
(74) *Attorney, Agent, or Firm* — Richard A. Dunning, Jr.

(57) ABSTRACT

Apparatus having corresponding methods and tangible computer-readable media comprise: an input module to receive a bitstream representing data words encoded according to a variable-length code; a peek module to select a peek block comprising a predetermined number of consecutive bits in the bitstream; and a decoder to provide a plurality of the data words based on the peek block.

15 Claims, 9 Drawing Sheets

| Order | Bit String | CodeNum Range |
|---|---|---|
| k = 0 | 1 | 0 |
| | 0 1 $x_0$ | 1 ~ 2 |
| | 0 0 1 $x_1$ $x_0$ | 3 ~ 6 |
| | 0 0 0 1 $x_2$ $x_1$ $x_0$ | 7 ~ 14 |
| | … … | … … |
| k = 1 | 1 $x_0$ | 0 ~ 1 |
| | 0 1 $x_1$ $x_0$ | 2 ~ 5 |
| | 0 0 1 $x_2$ $x_1$ $x_0$ | 6 ~ 13 |
| | 0 0 0 1 $x_3$ $x_2$ $x_1$ $x_0$ | 14 ~ 29 |
| | … … | … … |
| k = 2 | 1 $x_1$ $x_0$ | 0 ~ 3 |
| | 0 1 $x_2$ $x_1$ $x_0$ | 4 ~ 11 |
| | 0 0 1 $x_3$ $x_2$ $x_1$ $x_0$ | 12 ~ 27 |
| | 0 0 0 1 $x_4$ $x_3$ $x_2$ $x_1$ $x_0$ | 28 ~ 59 |
| | … … | … … |
| k = 3 | 1 $x_2$ $x_1$ $x_0$ | 0 ~ 7 |
| | 0 1 $x_3$ $x_2$ $x_1$ $x_0$ | 8 ~ 23 |
| | 0 0 1 $x_4$ $x_3$ $x_2$ $x_1$ $x_0$ | 24 ~ 55 |
| | 0 0 0 1 $x_5$ $x_4$ $x_3$ $x_2$ $x_1$ $x_0$ | 56 ~ 119 |
| | … … | … … |

FIG. 1

| Run | EOB | Level > 0 | | | | | | | | | | | | | | | RefAbs Level |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| | 0 | - | - | - | - | - | - | - | - | - | - | - | - | - | - | - | - | |
| 0 | - | 1 | 3 | 5 | 7 | 9 | 13 | 15 | 17 | 21 | 25 | 29 | 33 | 39 | 43 | 49 | 53 | 17 |
| 1 | - | 11 | 19 | 27 | 31 | 41 | 45 | 57 | - | - | - | - | - | - | - | - | - | 8 |
| 2 | - | 23 | 37 | 51 | - | - | - | - | - | - | - | - | - | - | - | - | - | 4 |
| 3 | - | 35 | 55 | - | - | - | - | - | - | - | - | - | - | - | - | - | - | 3 |
| 4 | - | 47 | - | - | - | - | - | - | - | - | - | - | - | - | - | - | - | 2 |

FIG. 2

| vlc_tab_id | bot_tab_id | bot_tab_off |
|---|---|---|
| VCL5_Inter | 2 | 166 |
| VCL5_Inter | 2 | 119 |
| VCL5_Inter | 2 | 143 |
| VCL5_Inter | 2 | 144 |
| VCL5_Inter | 2 | 145 |
| VCL5_Inter | 2 | 146 |
| VCL5_Inter | 2 | 147 |
| VCL5_Inter | 2 | 86 |
| VCL5_Inter | 2 | 87 |
| VCL5_Inter | 2 | 167 |
| VCL5_Inter | 2 | 168 |
| VCL5_Inter | 2 | 141 |
| VCL5_Inter | 2 | 142 |
| VCL6_Inter | 2 | 169 |
| VCL6_Inter | 2 | 170 |
| VCL5_Inter | 2 | 117 |

*FIG. 7*

| bits_used | run_0 | level_0 | run_1 | level_1 | Note |
|---|---|---|---|---|---|
| 6 | 1 | 1 | 1 | 1 | entry:0 |
| 6 | 1 | 1 | 1 | -1 | entry:1 |
| 6 | 1 | 1 | 2 | 1 | entry:2 |
| 6 | 1 | 1 | 2 | -1 | entry:3 |
| 6 | 1 | -1 | 1 | 1 | entry:4 |
| 6 | 1 | -1 | 1 | -1 | entry:5 |
| 6 | 1 | -1 | 2 | 1 | entry:6 |
| 6 | 1 | -1 | 2 | -1 | entry:7 |
| 6 | 2 | 1 | 1 | 1 | entry:8 |
| 6 | 2 | 1 | 1 | -1 | entry:9 |
| 6 | 2 | 1 | 2 | 1 | entry:10 |
| 6 | 2 | 1 | 2 | -1 | entry:11 |
| 6 | 2 | -1 | 1 | 1 | entry:12 |
| 6 | 2 | -1 | 1 | -1 | entry:13 |
| 6 | 2 | -1 | 2 | 1 | entry:14 |
| 6 | 2 | -1 | 2 | -1 | entry:15 |
| 6 | 1 | 1 | 1 | 2 | entry:16 |
| 6 | 1 | 1 | 1 | -2 | entry:17 |
| 6 | 1 | -1 | 1 | 2 | entry:18 |
| 6 | 1 | -1 | 1 | -2 | entry:19 |
| 6 | 1 | 2 | 1 | 1 | entry:20 |
| 6 | 1 | 2 | 1 | -1 | entry:21 |
| 6 | 1 | 2 | 1 | 2 | entry:22 |
| 6 | 1 | 2 | 1 | -2 | entry:23 |
| 6 | 1 | -2 | 1 | 1 | entry:24 |
| 6 | 1 | -2 | 1 | -1 | entry:25 |
| 6 | 1 | -2 | 1 | 2 | entry:26 |
| 6 | 1 | -2 | 1 | -2 | entry:27 |
| 7 | 1 | 1 | 1 | 1 | entry:28 |
| 7 | 1 | 1 | 1 | -1 | entry:29 |
| 7 | 1 | 1 | 2 | 1 | entry:30 |
| 7 | 1 | -1 | 1 | 1 | entry:31 |
| 7 | 1 | -1 | 1 | -1 | entry:32 |
| 7 | 1 | -1 | 2 | 1 | entry:33 |
| 7 | 2 | 1 | 1 | 1 | entry:34 |
| 7 | 2 | 1 | 1 | -1 | entry:35 |
| 7 | 2 | 1 | 2 | 1 | entry:36 |
| 7 | 2 | -1 | 1 | 1 | entry:37 |
| 7 | 2 | -1 | 1 | -1 | entry:38 |

*FIG. 8A*

| | | | | | |
|---|---|---|---|---|---|
| 7 | 2 | -1 | 2 | 1 | entry:39 |
| 7 | 3 | 1 | 1 | 1 | entry:40 |
| 7 | 3 | 1 | 1 | -1 | entry:41 |
| 7 | 3 | 1 | 2 | 1 | entry:42 |
| 7 | 3 | -1 | 1 | 1 | entry:43 |
| 7 | 3 | -1 | 1 | -1 | entry:44 |
| 7 | 3 | -1 | 2 | 1 | entry:45 |
| 7 | 4 | 1 | 1 | 1 | entry:46 |
| 7 | 4 | 1 | 1 | -1 | entry:47 |
| 7 | 4 | 1 | 2 | 1 | entry:48 |
| 7 | 4 | -1 | 1 | 1 | entry:49 |
| 7 | 4 | -1 | 1 | -1 | entry:50 |
| 7 | 4 | -1 | 2 | 1 | entry:51 |
| 8 | 2 | 1 | 1 | 1 | entry:52 |
| 8 | 2 | 1 | 1 | -1 | entry:53 |
| 8 | 2 | -1 | 1 | 1 | entry:54 |
| 8 | 2 | -1 | 1 | -1 | entry:55 |
| 7 | 1 | 2 | 1 | 1 | entry:56 |
| 7 | 1 | 2 | 1 | -1 | entry:57 |
| 7 | 1 | -2 | 1 | 1 | entry:58 |
| 7 | 1 | -2 | 1 | -1 | entry:59 |
| 7 | 1 | 1 | 1 | 1 | entry:60 |
| 7 | 1 | 1 | 1 | -1 | entry:61 |
| 7 | 1 | -1 | 1 | 1 | entry:62 |
| 7 | 1 | -1 | 1 | -1 | entry:63 |
| 4 | 1 | 1 | 1 | 1 | entry:64 |
| 4 | 1 | 1 | 1 | -1 | entry:65 |
| 4 | 1 | -1 | 1 | 1 | entry:66 |
| 4 | 1 | -1 | 1 | -1 | entry:67 |
| 6 | 1 | 3 | 1 | 1 | entry:68 |
| 6 | 1 | 1 | 1 | 3 | entry:69 |
| 6 | 1 | 1 | 1 | 1 | entry:70 |
| 8 | 1 | 2 | 1 | 1 | entry:71 |
| 8 | 1 | 2 | 1 | -1 | entry:72 |
| 8 | 1 | -2 | 1 | 1 | entry:73 |
| 8 | 1 | -2 | 1 | -1 | entry:74 |
| 8 | 1 | 3 | 1 | 1 | entry:75 |
| 8 | 1 | 3 | 1 | -1 | entry:76 |
| 8 | 1 | -3 | 1 | 1 | entry:77 |
| 8 | 1 | -3 | 1 | -1 | entry:78 |

*FIG. 8B*

COMBINING TRANSFORM COEFFICIENT DECODING WITH VARIABLE LENGTH DECODING

CROSS-REFERENCE TO RELATED APPLICATIONS

This application claims benefit of U.S. Provisional Patent Application Ser. No. 61/089,833 filed Aug. 18, 2008, the disclosure thereof incorporated by reference herein in its entirety.

BACKGROUND

The present disclosure relates generally to decoding data encoded with variable length codes.

Variable length coding (VLC) is almost ubiquitously used in video/audio compression standards to achieve efficient data compression. Though variable length coding is also used in encoding other syntax elements in a video/audio stream, the majority of bits in a bitstream are used for encoding transform coefficients. Accordingly, on the playback side, reconstruction of the audio/video conventionally requires two steps. First, variable length decoding (VLD) is applied to the encoded bitstream to obtain codewords. Then various (and usually large numbers of) look-up tables are used to recover the transform coefficients. Then other steps follow to reconstruct the video/audio based on the transform coefficients, such as inverse quantization, inverse transform, motion compensation, de-blocking, and the like.

Almost in any video/audio compression standard, some variable length code (VLC) is used to take advantage of statistical information to effectively reduce the data amount. The compression is achieved by using shorter bit strings to represent frequently occurring data while assigning longer bit strings to less frequently occurring data. A typical VLC decoding table in its raw format without any processing usually has a format including two or more columns. One column lists the encoded bit-strings, which are of variable length. One or more other columns list the value(s) of data words, such as syntax element(s) or transform coefficients, that the bit-strings represent.

Without loss of generality, a VLC decoding table can also be thought of having two columns with one column listing the variable-length bit-strings and the other column listing an integer number conventionally called "CodeNum". The CodeNum is used as an index to look up another table that contains one or more columns with each column indicating the value of a specific syntax element or transform coefficient defined in the standard's bit-stream format. While variable length codes are used to encode many kinds of syntax elements in a bitstream, the majority of the bits are used to encode transform coefficients in a bitstream.

Like other processing in decoding a bit-stream, reconstructing the transform coefficients takes a considerable number of computation cycles, which is typically around 30% of the total cycles needed, though the exact number can change from stream to stream depending on the bit-rate and other complexities in encoding the stream. So speeding up this processing will generally speed up the video decompression as a whole, which generally burdens the processors or specially designed hardware embedded in a device for multimedia related applications.

As is implied by its conceptual components, reconstructing the transform coefficients is conventionally done in two separate steps. In the first step, the variable length bit string is decoded to generate a fixed length code called "CodeNum", which is a very awkward operation in computer software or digital logic based hardware. In the second step, run-level tables or other kinds of tables are used to recover the transform coefficients based on the "CodeNum." Different variable length decoding methods or different specially designed tables are usually used to encode the transform coefficients or syntax elements, depending on many factors such as whether these syntax elements are for luma or chroma, whether the macroblock (MB) is intra encoded or motion compensated, and the like.

Another complexity arises from the fact that different tables will usually be used to recover intermediate data which will be further used to eventually recover the transform coefficients once the "CodeNum" is available. The number of tables is typically in the range of dozens. For example, there are around 30 tables for Context-Adaptive Variable-Length Coding (CAVLC) in the widely used standard H.264, and there are around 20 run-level tables in the Chinese video compression standard named Audio Video Standard (AVS).

Still another complexity arises because many corner cases exist as deeply rooted in the very philosophy of the variable length encoding. These corner cases occur with a very low probability, but must be processed in order to correctly decode the bitstream. It is a challenge to provide full functionality without spending too much on these rarely occurring corner cases.

SUMMARY

In general, in one aspect, an embodiment features an apparatus comprising: an input module to receive a bitstream representing data words encoded according to a variable-length code; a peek module to select a peek block comprising a predetermined number of consecutive bits in the bitstream; and a decoder to provide a plurality of the data words based on the peek block.

Embodiments of the apparatus can include one or more of the following features. In some embodiments, the decoder comprises: a prefix module to determine a number of zeros in leading prefix bits of the peek block; a top layer table select module to select one of a plurality of top layer tables based on the number of zeros in the leading prefix bits in the peek block; a top layer table index module to index the one of the plurality of top layer tables with bits following the leading prefix bits in the peek block, wherein in response the one of the plurality of top layer tables returns an identifier of one of a plurality of bottom layer tables and a bottom layer table offset; and a bottom layer table module to index the one of the plurality of bottom layer tables with the bottom layer table offset, wherein in response the one of the plurality of bottom layer tables returns the plurality of data words. In some embodiments, the one of the plurality of top layer tables returns a context identifier; and the top layer table select module selects a next top layer table based on the context identifier. Some embodiments comprise a further decoder to provide one of the data words based on the peek block when the number of zeros in the leading prefix bits in the peek block exceeds a predetermined threshold. Some embodiments comprise an output module to provide a media signal based on the data words. In some embodiments, the bitstream conforms to the Audio Video Standard (AVS).

In general, in one aspect, an embodiment features a method comprising:

receiving a bitstream representing data words encoded according to a variable-length code; selecting a peek block comprising a predetermined number of consecutive bits in the bitstream; and providing a plurality of the data words based on the peek block.

Embodiments of the method can include one or more of the following features. In some embodiments, providing the plurality of the data words based on the peek block comprises: determining a number of zeros in the leading prefix bits in the peek block; selecting one of a plurality of top layer tables based on the number of zeros in the leading prefix bits in the peek block; indexing the one of the plurality of top layer tables with bits following the leading prefix bits in the peek block, wherein in response the one of the plurality of top layer tables returns an identifier of one of a plurality of bottom layer tables and a bottom layer table offset; and indexing the one of the plurality of bottom layer tables with the bottom layer table offset, wherein in response the one of the plurality of bottom layer tables returns the plurality of data words. In some embodiments, the one of the plurality of top layer tables returns a context identifier; and the method selects a next top layer table based on the context identifier. Some embodiments comprise providing one of the data words based on the peek block according to an alternate method when the number of zeros in the leading prefix bits in the peek block exceeds a predetermined threshold. Some embodiments comprise providing a media signal based on the data words. In some embodiments, the bitstream conforms to the Audio Video Standard (AVS).

Some embodiments comprise tangible computer-readable media embodying instructions executable by a computer to perform a method comprising: receiving a bitstream representing data words encoded according to a variable-length code; selecting a peek block comprising a predetermined number of consecutive bits in the bitstream; and providing a plurality of the data words based on the peek block.

Embodiments of the tangible computer-readable media can include one or more of the following features. In some embodiments, providing the plurality of the data words based on the peek block comprises: determining a number of zeros in the leading prefix bits in the peek block; selecting one of a plurality of top layer tables based on the number of zeros in the leading prefix bits in the peek block; indexing the one of the plurality of top layer tables with bits following the leading prefix bits in the peek block, wherein in response the one of the plurality of top layer tables returns an identifier of one of a plurality of bottom layer tables and a bottom layer table offset; and indexing the one of the plurality of bottom layer tables with the bottom layer table offset, wherein in response the one of the plurality of bottom layer tables returns the plurality of data words. In some embodiments, the one of the plurality of top layer tables returns a context identifier; and the method selects a next top layer table based on the context identifier. In some embodiments, the method further comprises: providing one of the data words based on the peek block according to an alternate method when the number of zeros in the leading prefix bits in the peek block exceeds a predetermined threshold. In some embodiments, the method further comprises: providing a media signal based on the data words. In some embodiments, the bitstream conforms to the Audio Video Standard (AVS).

The details of one or more implementations are set forth in the accompanying drawings and the description below. Other features will be apparent from the description and drawings, and from the claims.

DESCRIPTION OF DRAWINGS

FIG. 1 illustrates the Golomb code for k=0 through k=3.
FIG. 2 shows the AVS run-level table VLC5_Inter.

FIG. 7 shows a top layer table that is selected when the decoding context is decoding an inter predictive encode luma block in AVS, and the number of zeros in the leading prefix bits is 2.
FIGS. 8A and 8B show an example bottom layer table for AVS called tbl_rl2.

Figure 3:
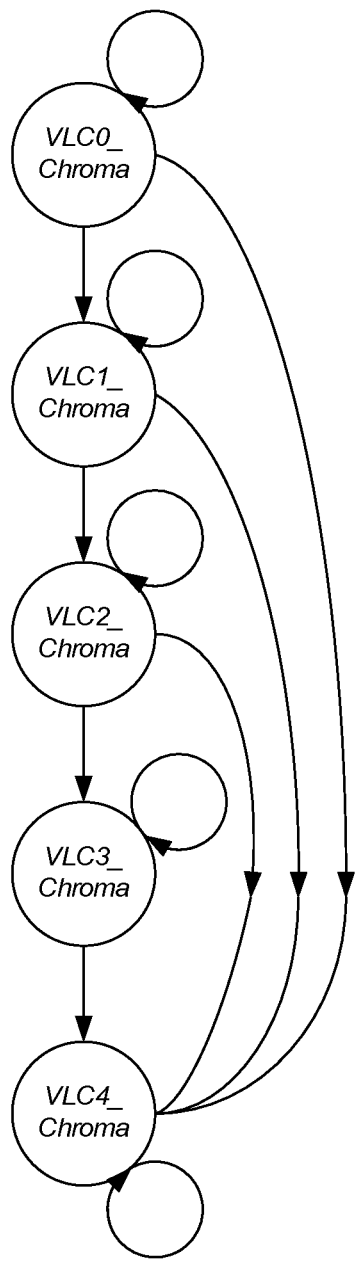
FIG. 3 illustrates table switching for the run-level pair decoding of chroma blocks in AVS.

The leading digit(s) of each reference numeral used in this specification indicates the number of the drawing in which the reference numeral first appears.

DETAILED DESCRIPTION

Embodiments of the present disclosure combine transform coefficient decoding with variable length decoding. Compared to conventional techniques where transform coefficient decoding and variable length decoding are done separately, the disclosed embodiments can achieve decoding speed-up with a controllable memory footprint for storing decoding tables structured as described below. The disclosed embodiments are described with reference to Chinese Audio Video Standard (AVS), which is described in the document "Audio Video Coding Standard Workgroup of China, GB/T 20090.2-2006: Information Technology—Advanced Audio and Video Coding—Part 2: Video." However, the techniques described herein apply to other similar systems and standards as well, as will be apparent after reading the present disclosure.

In AVS, the variable length code used to encode CodeNum values is the k-th order Golomb code. In AVS, four orders of Golomb codes are used in different contexts. FIG. 1 illustrates the Golomb code for k=0 through k=3. The bit string in the k-th order Golomb code consists of a prefix that includes a number of zero bits ("0") followed by a one bit ("1"), which is followed by a number of information bits x. The code order k indicates the relationship between the number of prefix bits and the number of information bits.

While other encoding methods may be used in other video standards, AVS uses run-level pairs to encode the quantized transform coefficients. This is an efficient way to represent the many zeros generated after transform coefficient quantization. The "CodeNum" decoded from k-th order Golomb is used as a key to access one of many run-level tables. For example, FIG. 2 shows the AVS run-level table VLC5_Inter. For example, referring to FIG. 2, if the value of CodeNum is 19, then the run is 1 and the level is 2. In AVS, there are around 20 run-level tables which are used in different contexts such as luma or chroma, the magnitude of the absolute level, intra encoded or inter predicted macroblock, and the like. For example, the run-level table VLC0_Inter is used to encode the first luma run-level pair for an inter predictive encoded macroblock.

Depending on the context, different orders of the Golomb code, and different kinds of run-level tables, may be used in AVS. For example, the 0th order Golomb code is used for VLC1_Chroma and VLC4_Chroma, the 1st order Golomb code is used for VLC2_Chroma and VLC3_Chroma, and the 3rd order Golomb code is used for VLC0_Inter, while the 2nd order Golomb code is used for other situations. The combination of VLC codes, run-level tables, and the conditions for table-switching together contribute to the complexity of the transform coefficient decoding processing.

The intrinsic essence of VLC coding is to use shorter bit strings to represent frequently occurring data while using longer bit strings for less frequently occurring data. AVS encoding incorporates this idea with a three-segment method. For the high probability segment, both the run and level can be looked up from the run-level tables. For the medium probability segment and the low probability segment, the run is calculated on-the-fly from bits extracted from the bitstream, and the level is calculated from a parameter called RefAbsLevel. The difference between the medium and the low probability segments lies in how the RefAbsLevel parameter is determined. For the medium probability segment, the RefAbsLevel parameter is obtained from looking up the run-level tables. For the low-probability segment, the RefAbsLevel parameter is always assumed to be 1. The dividing point between high and medium probability segments is CodeNum=59, while the dividing point between medium and low probability segments is determined by a parameter called MaxRun, which is defined differently for each run-level table, and which is translated to different values of CodeNum. However, it should be noted that these dividing points can be adjusted in various implementations to generate the same bit-accurate decoding results when adjusted in conjunction with other factors. For example, the dividing point between the medium and low probability segments can be adjusted in conjunction with modifying the tables for RefAbsLevel, which can be done by treating the constant "1" value for RefAbsLevel as being obtained from an augmented table for the medium probability segment. Techniques similar to this are sometimes needed because it is more convenient to set the dividing point by number of bits instead of a specific value.

Typically three kinds of bit operations should be sufficient in the decoding of a variable length code. Complex bit operations can be implemented by combining these three kinds of bit operations. While each type of operation may incur a different number of computation cycles, generally speaking, the less the number of bit operations, the faster the decoding, so a good variable length decoding method should try to reduce the number of bit operations, among other things. The three types of bit operations are Read_bits, which reads a fixed number of bits and moves the bit position pointer, Peek_bits, which reads a fixed number of bits but does not move the bit position pointer, and Skip_bits, which moves the bit position pointer by a specified number of bits without reading the bits.

Various embodiments disclosed herein incorporate one or more advantageous techniques. Once such technique serves to combine transform coefficient decoding with variable length decoding. A naïve method to achieve this end is to peek the maximum number of bits used in the variable length code, and to use them as a fixed bit index to build a look-up table, where the content of each entry includes the run-level values and number of bits used. However, the problem with this method is that the table will be very large with many entries. For example, in the 0th order Golomb code, 13 bits would be needed to cover the medium probability segment, resulting in 8192 entries. In various embodiments disclosed herein, the solution is to split the tables based on the number of prefix bits (that is, the number of leading zeros), and to use only the information bits in the Golomb code as an index to access the tables. This technique is very efficient in decreasing total number of entries in each table because prefix bits account for about half of the total bits in a k-th order Golomb code. This technique is also very practical, since modern DSPs or CPUs usually feature special instructions for finding the number of prefix bits of a number. To cover the medium probability segment, choices of leading prefix bits depend on the order of the Golomb code. For example, for the 2nd order Golomb code, leading zeros can number up to 4 bits in order to cover the range of [0, 123] for CodeNum.

Another advantageous technique serves to consume bits as fast as possible. If more bits can be consumed each time a fixed number of bits are peeked, then the total number of bit operations can be reduced, the number of cycles for variable length code decoding will be reduced, and video decoding will be sped up. In various embodiments disclosed herein, the solution is to try to decode multiple run-level pairs in each bits-peeking if possible, while in conventional methods, every time one CodeNum is decoded from a bitstream, the remaining bits are returned to the pool even when there are enough unconsumed peeked bits to decode another CodeNum. This technique is very efficient for those macroblocks having transform coefficients consisting of consecutive short Golomb codes. For example, if the peeked 9 bits for a 2nd order Golomb code are "101011001", instead of consuming the first 3-bit Golomb code "101" (for CodeNum=1) and returning the remaining 6 bits back to the pool, various embodiments disclosed herein consume 8 bits and decode two Golomb codes (CodeNum=101 and CodeNum=01100) and return only 1 bit (a "1") to the pool.

Another advantageous technique serves to embed table-switching into the tables themselves. In the decoding of AVS transform coefficients, a parameter named maxAbsLevel is maintained. Each time a run-level pair is decoded, the absolute value of the level is compared with maxAbsLevel to determine which run-level table will be used for succeeding bits. In various embodiments disclosed herein, the solution takes advantage of the fact that AVS table switching will either stay in the same table or move ahead along a single direction, but will never go back to previously used tables. This fact is illustrated in FIG. 3 for the run-level pair decoding of chroma blocks in AVS. In various embodiments, an extra field is included in certain tables to indicate which run-level table will be used for the next run-level pair, thus avoiding multiple time-consuming condition checks.

Another advantageous technique considers the cost-performance trade-off based on occurrence probability. When the number of bits used to index a table increases, the number of entries in the table increases exponentially. If all the variable length codes within the legitimate range were processed in the same manner, more bits would be needed, which would increase the amount of memory needed to store the tables. This would be a great waste of memory because most of the long codes occur with a very low probability. In various embodiments disclosed herein, the solution defines a parameter called cut-off number of leading-zeros. Only variable codes having a short enough length are decoded by pre-built tables, while the low probability segment is decoded on-the-fly as new bits are being consumed. This way, memory size is effectively contained while performance does not show any noticeable degradation.

Another advantageous technique implements flexible control of how many run-level pairs to decode for each bits peeking. While it is a good idea to decode multiple run-level pairs at each bits peeking, this idea should not be taken to extreme for several reasons. First, as more run-level pairs are decoded at each bits-peeking, more fields are needed in an entry to store the run-level values. This makes the table unnecessarily wide, and thus increases the amount of memory needed to store the table. Secondly, the more the number of run-level pairs in an entry, the lower the probability the entry will occur in a bitstream. Various embodiments disclosed herein can flexibly control how many run-level pairs to decode based on the trade-off between speed and memory. For example, in the case of 0th order Golomb code with 1 leading zero, a configuration can use 5 bits as an index to build a table with 32 entries. The 5 bits can cover 2 or 3 run-level pairs. For example, when the next Golomb code order is 0th, the 5 bits can cover the case x0-0-1-x0 (4 bits, 2 pairs). When the next Golomb code order is 1, the 5 bits can cover cases like x0-1-x0 (3 bits, 2 pairs), x0-0-1-x1-x0 (5 bits, 2 pairs) and x0-1-x0-1-x0 (5 bits, 3 pairs). In the 2nd order Golomb code, when there are 4 leading zeros, 6 extra bits would be needed to decode one run-level pair. This is relatively long, so multiple run-level pair decoding may not be pursued in this case, and in higher-order cases. Note that in all these examples, the prefix bits are not counted because they are not part of the information bits used to index a table.

Figure 4:
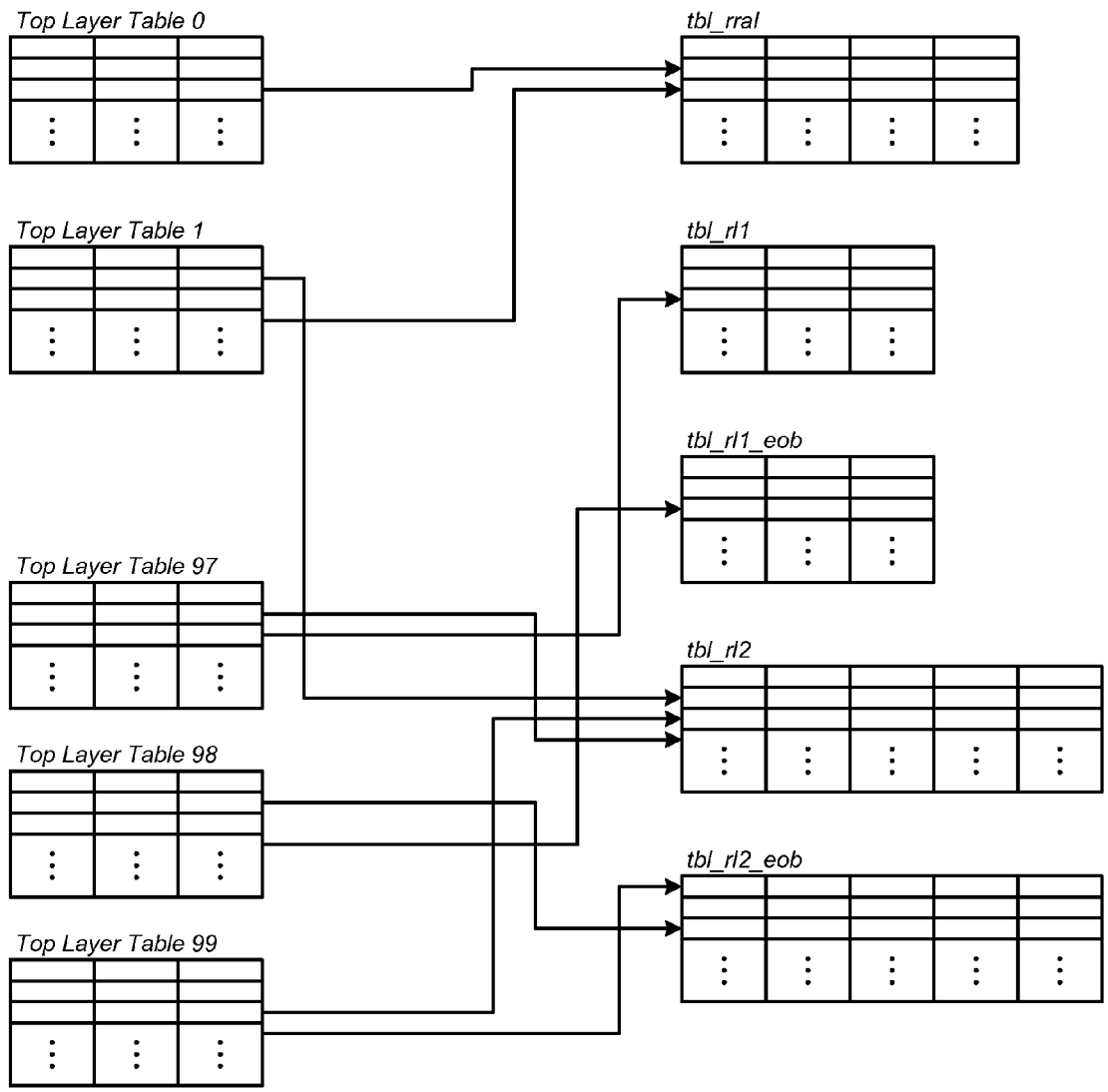
FIG. 4 illustrates a two-layer hierarchy employed by various embodiments.

Another advantageous technique restructures the tables hierarchically. Accordingly, the decoding can be done in a unified manner for all cases except the low probability code. In addition, many of the identical entries can be compressed to keep one copy only, thereby saving memory. Various embodiments disclosed herein re-organize the tables into a two-layer hierarchy with many top layer tables, and a few bottom layer tables shared by the top layer tables. This hierarchy is illustrated conceptually in FIG. 4. Referring to FIG. 4, each entry in a top layer table has a pointer linking to some bottom-layer table entry. It should be noted that one entry in a bottom-layer table may have multiple pointers coming from different top layer entries.

Figure 5:
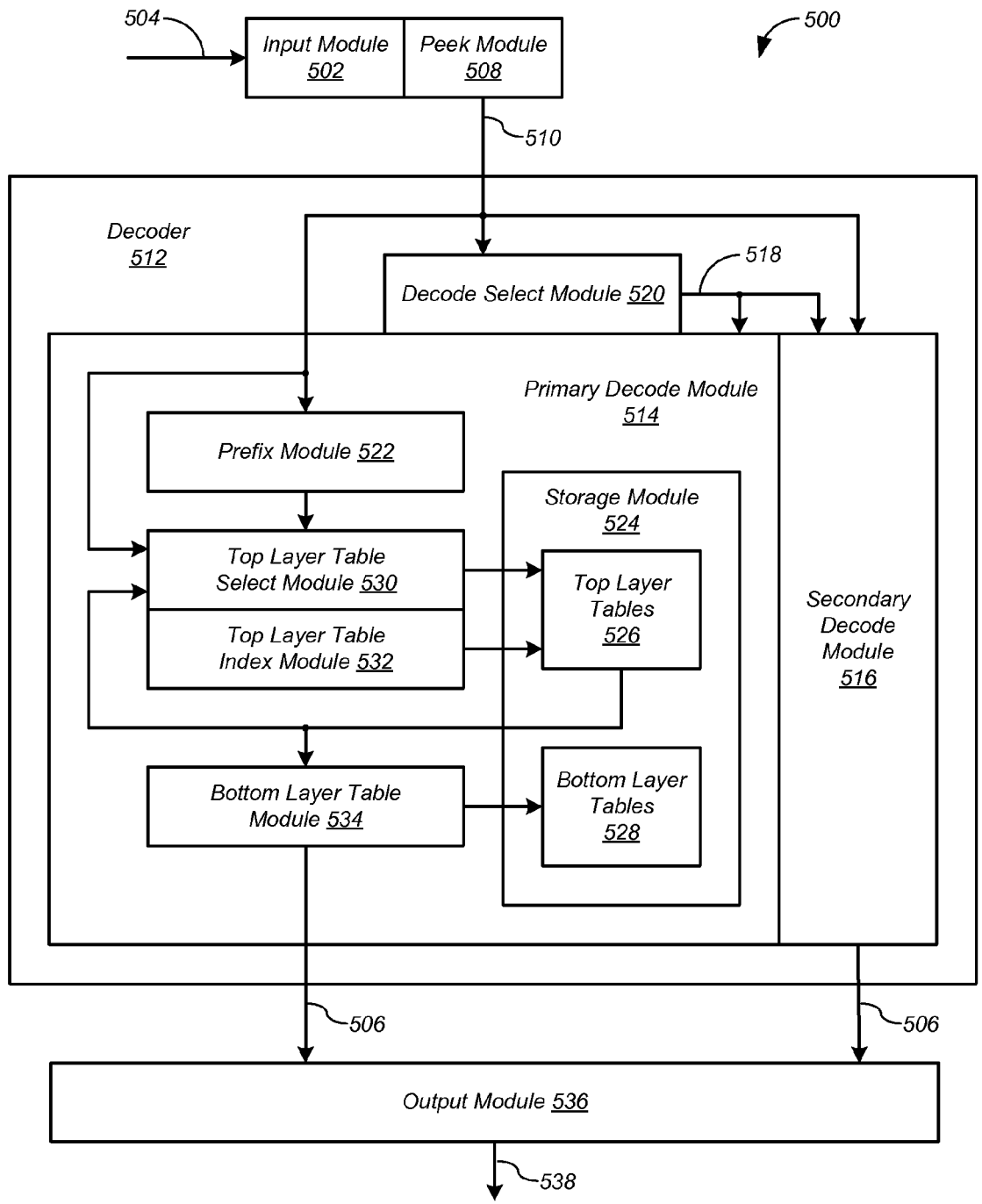
FIG. 5 shows elements of a data decoding system according to some embodiments of the present disclosure.

FIG. 5 shows elements of a data decoding system 500 according to some embodiments of the present disclosure. Although in the described embodiments, the elements of data decoding system 500 are presented in one arrangement, other embodiments may feature other arrangements, as will be apparent to one skilled in the relevant arts based on the disclosure and teachings provided herein. For example, the elements of data decoding system 500 can be implemented in hardware, software, or combinations thereof.

Referring to FIG. 5, data decoding system 500 includes an input module 502 to receive a bitstream 504 representing data words 506 encoded according to a variable-length code, a peek module 508 to select a peek block 510 comprising a predetermined number of consecutive bits in bitstream 504, and a decoder 512 to provide data words 506 based on peek blocks 510. Decoder 512 includes a primary decode module 514 implemented according to embodiments of the present disclosure, and a secondary decode module 516, which can be implemented according to any conventional technique. Decode modules 514 and 516 are selected in accordance with a decode select signal 518 provided by a decode select module 520 as described below.

Primary decode module 514 includes a prefix module 522 to determine the number of leading prefix bits in each peek block 510 and a storage module 524 to store a plurality of top layer tables 526 and bottom layer tables 528. Primary decode module 514 also includes a top layer table select module 530 to select top layer tables 526, a top layer table index module 532 to index top layer tables 526, and a bottom layer table module 534 to select and index bottom layer tables 528. Data decoding system 500 also includes an output module 536 to provide a media signal 538 based on decoded data words 506.

Figure 6A:
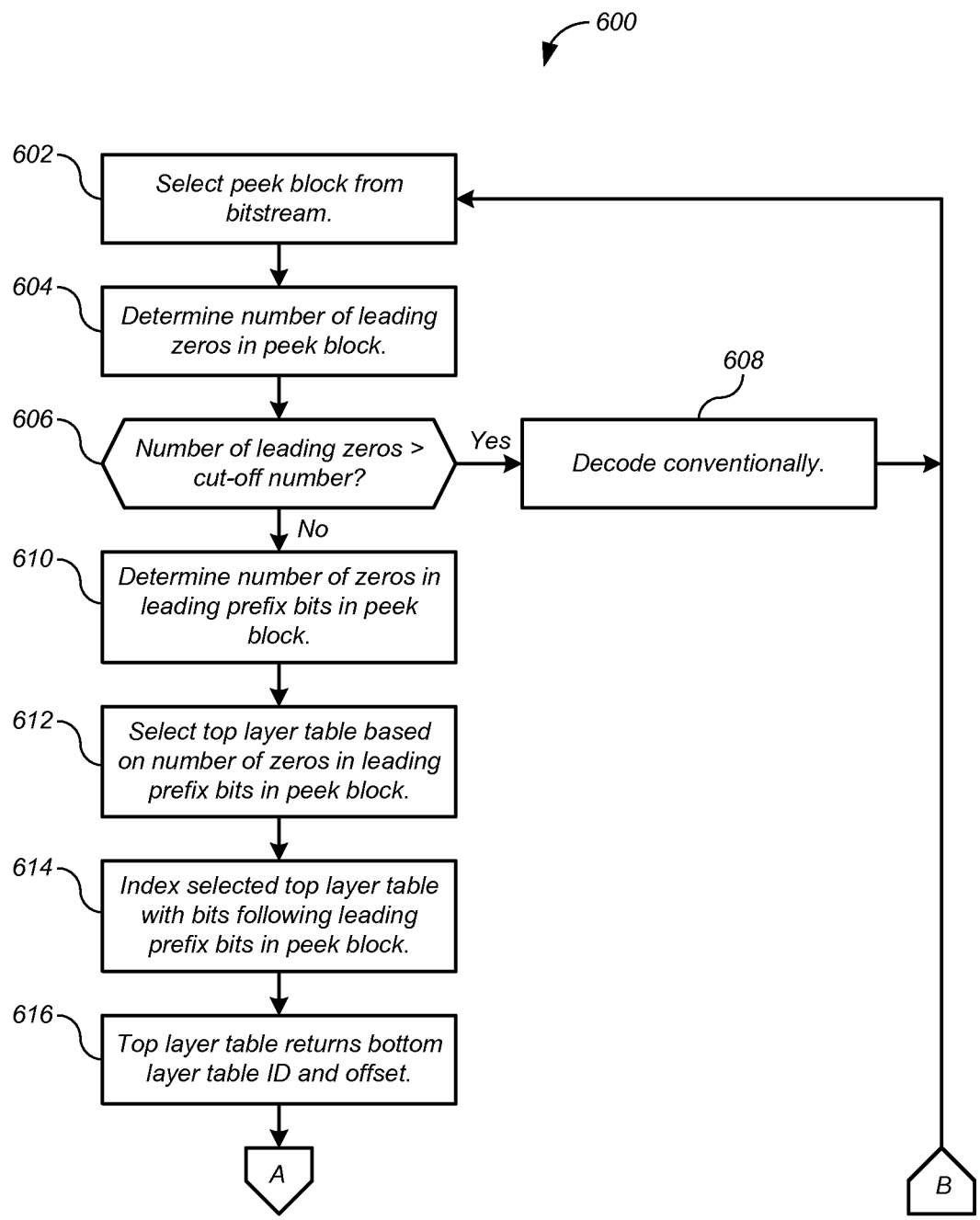
FIGS. 6A and 6B show a decoding process for the data decoding system of FIG. 5 according to some embodiments of the present disclosure.
Figure 6B:
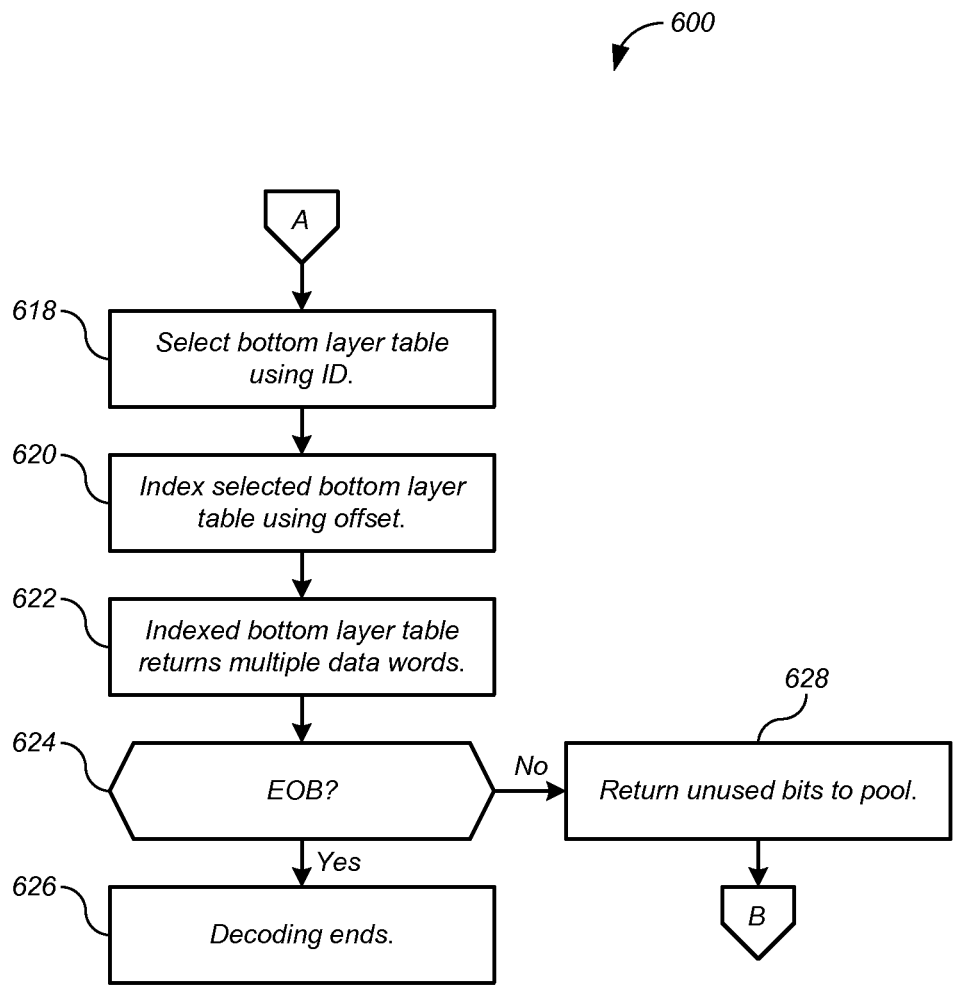

FIGS. 6A and 6B show a decoding process 600 for data decoding system 500 of FIG. 5 according to some embodiments of the present disclosure. Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Input module 502 receives bitstream 504. Bitstream 504 represents data words 506 encoded according to a variable-length code such as the Golomb code employed by the Chinese Audio Video Standard (AVS). Peek module 508 selects a peek block 510 comprising a predetermined number of consecutive bits in bitstream 504 (step 602). Peek module 508 passes peek block 510 to decoder 512.

Decode select module 520 determines the number of leading zeros in peek block 510 (step 604), and compares the number of leading zeros to the parameter cut-off number of leading-zeros (step 606). When the number of leading zeros exceeds cut-off number of leading-zeros, indicating a low probability segment, the bits in peek block 510 are decoded by secondary decode module 516 on-the-fly as new bits are being consumed (step 608). Otherwise, a high probability or medium probability segment is indicated, so the bits in peek block 510 are decoded by primary decode module 514.

In particular, prefix module 522 of primary decode module 514 determines the number of zeros in the leading prefix bits in peek block 510 (step 610). Top layer table select module 530 then selects one of top layer tables 526 based on the number of zeros in the leading prefix bits in peek block 510 (step 612). The selection of top layer table 526 also considers the current decoding context. For example, FIG. 7 shows a top layer table 526 that is selected when the decoding context is decoding an inter predictive encode luma block in AVS, and the number of zeros in the leading prefix bits is 2.

Referring to FIG. 7 as an example, each entry in each top layer table 526 contains 3 fields. The first field, vlc_tab_id, contains a context identifier of the next run-level table to access after decoding some of the bits in peek block 510. The second field, bot_tab_id, contains the identifier of the bottom layer table 528 associated with the entry. The third field, bot_tab_off, contains an offset that indicates the associated entry in the associated bottom layer table 528.

Referring again to FIGS. 5 and 6, top layer table index module 532 indexes the selected top layer table 526 with the bits following the leading prefix bits in peek block 510 (step 614). In response, the indexed top layer table 526 returns the corresponding values of vlc_tab_id, bot_tab_id, and bot_tab_off (step 616).

The total number of top layer tables 526 is determined by three factors: the order of the Golomb code, the VLC table used to decode the run-level pair, and the cut-off number of leading zeros. As an example for AVS, there might be 100 top layer tables 526, which comes from the summation of the 4 orders of Golomb codes used in AVS. In the 0th order Golomb code, the leading-zeros can number up to 6 starting from 0, and 2 VLC tables (VLC1_Chroma and VLC4_Chroma) use this encoding, so the number of top layer tables 526 will be 7*2=14. In the 1st order Golomb code, the leading-zeros can number up to 5 starting from 0, and 2 VLC tables (VLC2_Chroma and VLC3_Chroma) use this encoding, so the number of top layer tables 526 will be 6*2=12. In the 2nd order Golomb code, the leading-zeros can number up to 4 starting from 0, and 14 VLC tables (VLC1_Inter, VLC2_Inter, etc) use this encoding, so the number of top layer tables 526 will be 5*14=70. In the 3rd order Golomb code, the leading-zeros can number up to 3 starting from 0, and only 1 VLC table (VLC0_Inter) uses this encoding, so the number of top layer tables 526 will be 4*1=4.

The types of bottom layer tables 526 are determined based on the upper limit of the number of run-level pairs to decode within one bits-peeking, taking into consideration some special cases. For example, in the medium probability segment, the VLC table used is not a run-level table, but a run-RefAbsLevel table. Another consideration is that bits consumption may be stopped by encountering an EOB (end of block) Golomb code which indicates the end of the current block. The types of bottom layer tables 528 in general should be far less than the number of top layer tables 526. For example, there may be 5 different bottom layer tables 528, as illustrated in FIG. 4.

Referring again to FIG. 4, the bottom layer tables include tbl_rral, which is derived from run-RefAbsLevel table and used to decode the medium probability code, tbl_rl1, which can decode 1 run-level pair that is not followed by a EOB, tbl_rl1_eob, which can decode 1 run-level pair that is followed by a EOB, tbl_rl2, which can decode 2 run-level pairs that is not followed by a EOB, and tbl_rl2 eob, which can decode 2 run-level pairs that is followed by a EOB.

The structure of the different types of bottom layer tables 528 is very similar. Except for table tbl_rral, the tables 528 differ only in the number of run-level pairs to decode. Bottom layer tables 528 are shared by top layer tables 526. Every entry in a bottom layer table 528 should be unique to avoid redundancy and save memory.

FIGS. 8A and 8B show an example bottom layer table 528 for AVS called tbl_rl2. Referring to FIG. 8, table tbl_rl2 contains 5 fields. The first field, bits_used, contains the number of bits consumed in the peeked bits. The second field, run_0, contains the 0th run value. The third field, level_0, contains the 0th level value. The fourth field, run_1, contains the 1st run value. The fifth field, level_1, contains the 1st level value.

Referring again to FIGS. 5 and 6, bottom layer table module 534 selects a bottom layer table 528 using vlc_tab_id and bot_tab_id (step 618), and indexes the selected bottom layer table 528 using bot_tab_off (step 620). In response, the indexed bottom layer table 528 returns multiple corresponding data words 506 (step 622). For example, in AVS, the indexed bottom layer table 528 returns the corresponding run-level pairs. In the example of FIG. 8, table tbl_rl2 returns two run-level pairs.

If an EOB is encountered (step 624), then decoding ends (step 626). Otherwise, any unused bits are returned to the pool (step 628), where they are included in the next peek block (returning to step 602).

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described. Nevertheless, it will be understood that various modifications may be made without departing from the spirit and scope of the disclosure. Accordingly, other implementations are within the scope of the following claims.

What is claimed is:

1. An apparatus comprising:
    an input module to receive a bitstream representing data words encoded according to a variable-length code, wherein the bitstream conforms to the Audio Video Standard (AVS);
    a peek module to select a peek block comprising a predetermined number of consecutive bits in the bitstream; and
    a decoder to provide a plurality of the data words based on the peek block.

2. The apparatus of claim 1, wherein the decoder comprises:
    a prefix module to determine a number of zeros in leading prefix bits of the peek block;
    a top layer table select module to select one of a plurality of top layer tables based on the number of zeros in the leading prefix bits in the peek block;
    a top layer table index module to index the one of the plurality of top layer tables with bits following the leading prefix bits in the peek block, wherein in response the one of the plurality of top layer tables returns an identifier of one of a plurality of bottom layer tables and a bottom layer table offset; and
    a bottom layer table module to index the one of the plurality of bottom layer tables with the bottom layer table offset, wherein in response the one of the plurality of bottom layer tables returns the plurality of data words.

3. The apparatus of claim 2:
    wherein the one of the plurality of top layer tables returns a context identifier; and
    wherein the top layer table select module selects a next top layer table based on the context identifier.

4. The apparatus of claim 1, further comprising:
    a further decoder to provide one of the data words based on the peek block when the number of zeros in the leading prefix bits in the peek block exceeds a predetermined threshold.

5. The apparatus of claim 1, further comprising:
    an output module to provide a media signal based on the data words.

6. A method comprising:
    receiving a bitstream representing data words encoded according to a variable-length code, wherein the bitstream conforms to the Audio Video Standard (AVS);
    selecting a peek block comprising a predetermined number of consecutive bits in the bitstream; and
    providing a plurality of the data words based on the peek block.

7. The method of claim 6, wherein providing the plurality of the data words based on the peek block comprises:
- determining a number of zeros in the leading prefix bits in the peek block;
- selecting one of a plurality of top layer tables based on the number of zeros in the leading prefix bits in the peek block;
- indexing the one of the plurality of top layer tables with bits following the leading prefix bits in the peek block, wherein in response the one of the plurality of top layer tables returns an identifier of one of a plurality of bottom layer tables and a bottom layer table offset; and
- indexing the one of the plurality of bottom layer tables with the bottom layer table offset, wherein in response the one of the plurality of bottom layer tables returns the plurality of data words.

8. The method of claim 7:
- wherein the one of the plurality of top layer tables returns a context identifier; and
- wherein the method selects a next top layer table based on the context identifier.

9. The method of claim 6, further comprising:
- providing one of the data words based on the peek block according to an alternate method when the number of zeros in the leading prefix bits in the peek block exceeds a predetermined threshold.

10. The method of claim 6, further comprising:
- providing a media signal based on the data words.

11. Tangible computer-readable media embodying instructions executable by a computer to perform a method comprising:
- receiving a bitstream representing data words encoded according to a variable-length code, wherein the bitstream conforms to the Audio Video Standard (AVS);
- selecting a peek block comprising a predetermined number of consecutive bits in the bitstream; and
- providing a plurality of the data words based on the peek block.

12. The tangible computer-readable media of claim 11, wherein providing the plurality of the data words based on the peek block comprises:
- determining a number of zeros in the leading prefix bits in the peek block;
- selecting one of a plurality of top layer tables based on the number of zeros in the leading prefix bits in the peek block;
- indexing the one of the plurality of top layer tables with bits following the leading prefix bits in the peek block, wherein in response the one of the plurality of top layer tables returns an identifier of one of a plurality of bottom layer tables and a bottom layer table offset; and
- indexing the one of the plurality of bottom layer tables with the bottom layer table offset, wherein in response the one of the plurality of bottom layer tables returns the plurality of data words.

13. The tangible computer-readable media of claim 12:
- wherein the one of the plurality of top layer tables returns a context identifier; and
- wherein the method selects a next top layer table based on the context identifier.

14. The tangible computer-readable media of claim 11, wherein the method further comprises:
- providing one of the data words based on the peek block according to an alternate method when the number of zeros in the leading prefix bits in the peek block exceeds a predetermined threshold.

15. The tangible computer-readable media of claim 11, wherein the method further comprises:
- providing a media signal based on the data words.

* * * * *